(12) United States Patent
Park et al.

(10) Patent No.: US 11,536,313 B2
(45) Date of Patent: Dec. 27, 2022

(54) WHEEL BEARING ASSEMBLY

(71) Applicant: ILJIN GLOBAL Co., Ltd, Seoul (KR)

(72) Inventors: Jung Yang Park, Seoul (KR); Jong Keun Lim, Seoul (KR); Yun Ho Jung, Seoul (KR); Bo Young Jang, Seoul (KR)

(73) Assignee: ILJIN GLOBAL Co., Ltd, Seoul (KR)

(*) Notice: Subject to any disclaimer, the term of this patent is extended or adjusted under 35 U.S.C. 154(b) by 0 days.

(21) Appl. No.: 17/050,977

(22) PCT Filed: Apr. 29, 2019

(86) PCT No.: PCT/KR2019/005162
§ 371 (c)(1),
(2) Date: Jan. 11, 2021

(87) PCT Pub. No.: WO2019/209093
PCT Pub. Date: Oct. 31, 2019

(65) Prior Publication Data
US 2021/0231168 A1    Jul. 29, 2021

(30) Foreign Application Priority Data
Apr. 27, 2018  (KR) .................. 10-2018-0049432

(51) Int. Cl.
*F16C 19/18*      (2006.01)
*B60B 27/00*     (2006.01)

(52) U.S. Cl.
CPC ........ *F16C 19/186* (2013.01); *B60B 27/0005* (2013.01); *B60B 27/0036* (2013.01);
(Continued)

(58) Field of Classification Search
CPC ...... F16C 19/185; F16C 19/186; F16C 43/04; F16C 2223/10–18; F16C 2326/02;
(Continued)

(56) References Cited

U.S. PATENT DOCUMENTS 6,357,925 B2   3/2002  Tajima et al.
6,790,145 B2   9/2004  Niebling et al.
(Continued)

FOREIGN PATENT DOCUMENTS

JP   H11151904 A   6/1999
JP   2001233009 A  8/2001
(Continued)

OTHER PUBLICATIONS

Machine Translation of JP 2001-233009 (Year: 2001).*
(Continued)

*Primary Examiner* — Alan B Waits
(74) *Attorney, Agent, or Firm* — Dinsmore & Shohl LLP; Yongsok Choi, Esq.

(57) ABSTRACT

A wheel bearing assembly includes a wheel hub, at least one inner ring, an outer ring, and one or more rolling elements. An accommodation space may be formed inward of a vehicle-body-side end portion of the wheel hub to accommodate a constant velocity joint, and a plurality of recesses for accommodating rotating elements of the constant velocity joint are formed on an inner peripheral surface of the accommodation space to be spaced apart from each other along a circumferential direction. A first heat-treated hardened portion may be formed on the inner peripheral surface of the accommodation space, and may be formed to have portions with which the rotating elements of the constant velocity joint is brought into contact. A second heat-treated hardened portion may formed on an outer peripheral surface of the wheel hub. The first and second heat-treated hardened portions may not overlap each other.

10 Claims, 11 Drawing Sheets

(52) U.S. Cl.
CPC ....... *B60B 2380/12* (2013.01); *F16C 2223/10* (2013.01); *F16C 2326/02* (2013.01)

(58) Field of Classification Search
CPC ............. F16C 2240/80; B60B 27/0005; B60B 27/0036; B60B 27/0078; B60B 27/0084; B60B 27/0094; B60B 35/128; B60B 2310/54; B60B 2380/12
See application file for complete search history.

(56) References Cited

U.S. PATENT DOCUMENTS

| | | | | |
|---|---|---|---|---|
| 2002/0018608 | A1* | 2/2002 | Miyazaki | B60B 27/0084 384/544 |
| 2004/0037482 | A1* | 2/2004 | Ouchi | F16C 35/063 384/544 |
| 2004/0234183 | A1* | 11/2004 | Ohtsuki | F16C 43/04 384/544 |
| 2013/0292996 | A1* | 11/2013 | Yokota | B60B 27/00 301/109 |
| 2018/0209482 | A1* | 7/2018 | Suma | F16C 33/768 |

FOREIGN PATENT DOCUMENTS

| | | | |
|---|---|---|---|
| JP | 2005249047 A | 9/2005 | |
| JP | 2009287699 A | * 12/2009 | ............ F16C 35/063 |
| KR | 1020030026324 A | 3/2003 | |

OTHER PUBLICATIONS

Machine Translation of JP-2009287699-A (Year: 2009).*
International Search Report of PCT/KR2019/005162 dated Aug. 13, 2019.

* cited by examiner

WHEEL BEARING ASSEMBLY

CROSS-REFERENCE TO RELATED APPLICATIONS

This application is a national phase of International Application No. PCT/KR2019/005162 filed on Apr. 29, 2019 which claims priority to Korean Patent Application No. 10-2018-0049432 filed on Apr. 27, 2018, the entire contents of which are herein incorporated by reference.

TECHNICAL FIELD

The present disclosure relates to a wheel bearing assembly for rotatably mounting and supporting a vehicle wheel to a vehicle body; more particularly, to a wheel bearing assembly configured such that a constant velocity joint connected to a driving shaft of a vehicle is inserted into a wheel bearing, thus achieving miniaturization and weight reduction.

BACKGROUND ART

A wheel bearing for vehicle is a device for rotatably mounting and supporting a vehicle wheel to a vehicle body, and may be classified into a wheel bearing for driving wheel mounted to a driving wheel of a vehicle and a wheel bearing for driven wheel mounted to a driven wheel of a vehicle. Among them, the wheel bearing for driving wheel is configured such that a constant velocity joint connected to a driving shaft is coupled to the wheel bearing, and thus a driving force generated in a driving apparatus is transmitted to the wheel bearing through the constant velocity join and then is provided to the wheel.

Referring to FIG. 1, a conventional wheel bearing assembly for driving shaft (so-called third-generation wheel bearing assembly) is exemplarily illustrated. As shown in FIG. 1, the wheel bearing assembly for driving shaft is configured such that a rotating member 10 (wheel hub) to which a wheel is mounted is coupled to a non-rotating member 20 (outer ring) fixed to a vehicle body through rolling elements 30. The wheel mounted on the rotating member 10 (wheel hub) is rotatably mounted and supported to the vehicle body. A constant velocity joint 40 is coupled to one side of the wheel bearing so that a driving force generated in a driving apparatus is transmitted to the wheel bearing. Specifically, the constant velocity joint 40 is coupled to the wheel bearing in a state in which an outer member having rotating elements provided therein is brought into contact with an axial end portion of the wheel bearing. Splines formed on a central shaft 50 of the constant velocity joint 40 are engaged with splines formed on an inner peripheral surface of the wheel hub 10 so that the driving force generated in the driving apparatus is transmitted to the wheel hub 10.

However, since the wheel bearing assembly configured as above is configured such that the constant velocity joint is coupled to the wheel bearing while being brought into contact with the axial end portion of the wheel hub from the outside of the wheel hub, the length of the wheel bearing assembly is increased. In addition, in the wheel bearing assembly configured as above, the splines formed on the outer peripheral surface of the central shaft of the constant velocity joint are engaged with the splines formed on the inner peripheral surface of the wheel hub so as to transmit the driving force to the wheel hub. As a result, the central shaft of the constant velocity joint is required to have a long length so as to pass through the wheel hub. This may increase the weight of the apparatus and may cause a problem that noise is generated upon acceleration and deceleration in the course of transmitting the driving force via the splines.

In order to address such problems, there has been proposed a wheel bearing assembly (so-called fourth-generation wheel bearing assembly) in which a constant velocity joint is inserted into and coupled to a wheel hub of a wheel bearing, as disclosed in Patent Document 1 and the like.

As shown in FIGS. 2 and 3, the fourth-generation wheel bearing assembly is configured such that the constant velocity joint 40 is coupled to the wheel bearing in a state in which a portion of the constant velocity joint 40 is positioned inside the wheel hub of the wheel bearing. As a result, the total length of the wheel bearing assembly may be shortened as much as a length of the constant velocity joint inserted into the wheel hub, thereby reducing the size and weight of the wheel bearing assembly.

However, in the case of the four-generation wheel bearing assembly known in the related art, an outer member 44 is separately provided between the constant velocity joint and the wheel hub to support rotating elements 42 of the constant velocity joint 40 and transfer the driving force to the wheel bearing, and a fixing member 46 is additionally provided on one end of the outer member 44 to prevent deviation of the outer member 44. This results in an increased number of parts and an increase in weight and cost of the product.

PRIOR ART DOCUMENT

Patent Document 1: U.S. Pat. No. 6,790,145

SUMMARY

Technical Problem

The present disclosure is to solve the above-described problems of the prior art, and an object of the present disclosure is to provide a wheel bearing assembly configured such that a constant velocity joint is coupled to a wheel bearing in a state in which the constant velocity joint is inserted into the wheel bearing without additional components, thereby achieving miniaturization and weight reduction.

Technical Solution

According to one embodiment of the present disclosure, there is provided a wheel bearing assembly used for rotatably mounting and supporting a vehicle wheel to a vehicle body. The wheel bearing assembly according to one embodiment of the present disclosure may comprise: a wheel hub having a hub flange on which a wheel is mounted; at least one inner ring configured to be press-fitted and mounted to one side of the wheel hub; an outer ring provided radially outward of the inner ring and having a mounting flange, which is formed on an outer peripheral surface of the outer ring and on which a vehicle body is coupled; and one or more rolling elements configured to rotatably support the wheel hub and the inner ring with respect to the outer ring. According to one embodiment of the present disclosure, an accommodation space may be formed inward of a vehicle-body-side end portion of the wheel hub to accommodate a constant velocity joint. According to one embodiment of the present disclosure, a plurality of recesses for accommodating rotating elements of the constant velocity joint may be formed on an inner peripheral surface of the accommodation space to be spaced apart from each other along a circumferential direction. According to one embodiment of the present disclosure, a first heat-treated hardened portion may be formed on the inner peripheral surface of the accommodation space, wherein the first heat-treated hardened portion may be formed to include portions with which the rotating elements of the constant velocity joint are brought into contact. According to one embodiment of the present disclosure, a second heat-treated hardened portion may be formed on an outer peripheral surface of the wheel hub, wherein the first heat-treated hardened portion and the second heat-treated hardened portion may be formed so as not to overlap each other.

According to one embodiment of the present disclosure, a depth of a hardened layer of the first heat-treated hardened portion and the second heat-treated hardened portion may be greater than or equal to 1 mm and less than or equal to 3 mm.

According to one embodiment of the present disclosure, a minimum radial thickness between the outer peripheral surface of the wheel hub on which the inner ring is mounted and an inner peripheral surface of the wheel hub with which the rotating elements of the constant velocity joint are brought into contact may be greater than or equal to 5 mm and less than or equal to 10 mm.

According to one embodiment of the present disclosure, the inner ring mounted on the wheel hub may be configured to be fixed on the wheel hub by plastically deforming the vehicle-body-side end portion of the wheel hub.

According to one embodiment of the present disclosure, an axial distance between a vehicle-body-side axial end portion of the inner ring and the end portion located more adjacent to the vehicle body among a vehicle-body-side axial end portion of the first heat-treated hardened portion and a vehicle-body-side axial end portion of the second heat-treated hardened portion may be greater than or equal to 2 mm.

According to one embodiment of the present disclosure, before plastically deforming the vehicle-body-side end portion of the wheel hub, a ratio between a height of the vehicle-body-side end portion of the inner ring, which is configured to support the rolling elements located at the vehicle-body-side, and an axial distance from the vehicle-body-side end portion of the inner ring, which is configured to support the rolling elements located at the vehicle-body-side, to the vehicle-body-side end portion of the wheel hub, may be greater than or equal to 0.5 and less than or equal to 2.

According to one embodiment of the present disclosure, before plastically deforming the vehicle-body-side end portion of the wheel hub, a reduced-diameter portion having a reduced diameter may be provided on the outer peripheral surface of the vehicle-body-side end portion of the wheel hub, wherein a depth of the reduced-diameter portion may be greater than or equal to 0.1 mm and less than or equal to 0.5 mm, and an axial distance between a starting position of the reduced-diameter portion and the vehicle-body-side axial end portion of the inner ring, which is configured to support the rolling elements located at the vehicle-body-side, may be greater than or equal to 0.5 mm and less than or equal to 5 mm.

According to one embodiment of the present disclosure, the wheel bearing assembly may further comprise a spacer coupled to the vehicle-body-side end portion of the inner ring, wherein an axial distance between a vehicle-body-side axial end portion of the spacer and the end portion located more adjacent to the vehicle body among the vehicle-body-side axial end portion of the first heat-treated hardened portion and the vehicle-body-side axial end portion of the second heat-treated hardened portion, may be greater than or equal to 2 mm.

According to one embodiment of the present disclosure, before plastically deforming the vehicle-body-side end portion of the wheel hub, a ratio between a height of the vehicle-body-side end portion of the spacer and an axial distance from the vehicle-body-side end portion of the spacer to the vehicle-body-side end portion of the wheel hub may be greater than or equal to 0.5 and less than or equal to 2.

According to one embodiment of the present disclosure, before plastically deforming the vehicle-body-side end portion of the wheel hub, a reduced-diameter portion having a reduced diameter may be provided on the outer peripheral surface of the vehicle-body-side end portion of the wheel hub, wherein a depth of the reduced-diameter portion may be greater than or equal to 0.1 mm and less than or equal to 0.5 mm, and an axial distance between a starting position of the reduced-diameter portion and the vehicle-body-side end portion of the spacer may be greater than or equal to 0.5 mm and less than or equal to 5 mm.

According to one embodiment of the present disclosure, the wheel bearing assembly may further comprise the constant velocity joint inserted into and coupled to the inner peripheral surface of the vehicle-body-side end portion of the wheel hub, wherein the constant velocity joint may be coupled to the wheel hub such that the rotating elements are accommodated in the recess formed on the inner peripheral surface of the vehicle-body-side end portion of the wheel hub.

In addition, the wheel bearing assembly according to the present disclosure may further comprise other additional configurations without departing from the technical sprit of the present disclosure.

Advantageous Effects

The wheel bearing assembly according to one embodiment of the present disclosure is configured such that recesses for receiving rotating elements of a constant velocity joint are formed on an inner peripheral surface of a wheel hub of a wheel bearing. Further, the wheel bearing assembly according to one embodiment of the present disclosure is configured such that the rotating elements of the constant velocity joint can be stably positioned and supported inside the wheel hub without a separate additional member for supporting an outer surface of the rotating elements. Accordingly, it is possible in the wheel bearing assembly according to one embodiment of the present to reduce the size and the weight of the wheel bearing assembly.

In addition, the wheel bearing assembly according to one embodiment of the present disclosure is configured such that heat-treated hardened portions are formed on an outer peripheral surface of the wheel hub, with which the rolling elements of the wheel bearing are brought into contact or onto which the inner ring is press-fitted, and on an inner peripheral surface of the wheel hub with which the rotating elements of the constant velocity joint are in contact. Therefore, the rolling elements of the wheel bearing (or the inner ring) and the rotating elements of the wheel bearing can be stably mounted on and supported by the wheel hub.

In addition, the wheel bearing assembly according to one embodiment of the present disclosure is configured such that the heat-treated hardened portion formed on the outer peripheral surface of the wheel hub and the heat-treated hardened portion formed on the inner peripheral surface of the wheel hub are formed so as not to overlap each other. This makes it possible to prevent occurrence of damage such as cracks and the like due to the overlap of the heat-treated hardened portions.

In addition, the wheel bearing assembly according to one embodiment of the present disclosure is configured such a thickness of the wheel hub on which heat treatment is performed on the outer peripheral surface and the inner peripheral surface of the wheel hub and a thickness of the hardened layer of the heat-treated hardened portions are controlled to fall within a predetermined range. Thus, it is possible to more stably prevent the heat-treated hardened portions formed on the outer peripheral surface and the inner peripheral surface of the wheel hub from overlapping each other.

In addition, the wheel bearing assembly according to one embodiment of the present disclosure is configured such the heat-treated hardened portions formed on the inner peripheral surface and the outer peripheral surface of the wheel hub are positioned at a position spaced apart from the portion at which a plastic deformation portion begins (the vehicle-body-side end portion of the inner ring or the spacer). This makes it is possible to prevent occurrence of a problem that cracks are generated in the wheel hub or damage is exerted on the wheel hub in the process of plastically deforming the vehicle-body-side end portion of the wheel hub for fixing the inner ring to the wheel hub.

Furthermore, the wheel bearing assembly according to one embodiment of the present disclosure is configured such a ratio between a height of the portion at which the plastic deformation portion begins (the vehicle-body-side end portion of the inner ring or the spacer) and a distance from the portion at which the plastic deformation portion begins to the vehicle-body-side end portion of the wheel hub is controlled to fall within an appropriate range. This makes it is possible to form the plastic deformation portion capable of stably supporting the inner ring while applying an appropriate pre-load.

In addition, the wheel bearing assembly according to one embodiment of the present disclosure is configured such that a reduced-diameter portion having a reduced diameter is formed in the vehicle-body-side end portion of the wheel hub, and a depth of the reduced-diameter portion and the position at which the reduced-diameter portion begins are controlled to fall within an appropriate range. This makes it is possible to prevent deformation of the wheel hub or the durability of the bearing from being deteriorated in the process of fixing the inner ring by plastically deforming the vehicle-body-side end portion of the wheel hub.

EXPLANATION OF REFERENCE NUMERALS

Figure 1:
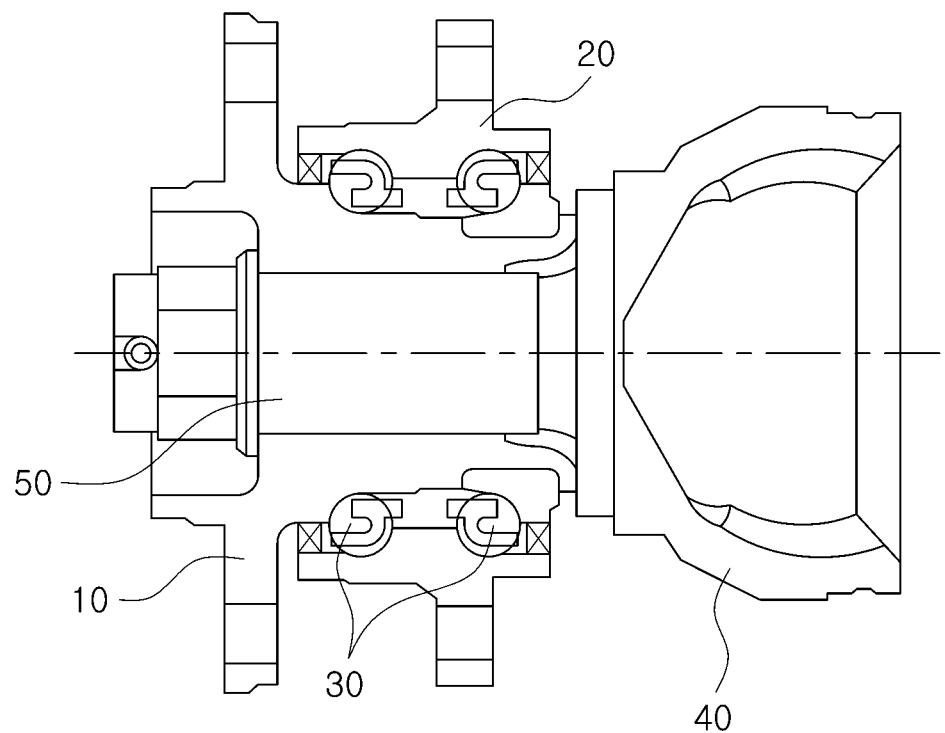
FIG. 1 exemplarily illustrates a conventional wheel bearing assembly for driving wheel (so-called three-generation wheel bearing assembly).

100: wheel bearing assembly
200: wheel bearing
210: wheel hub
220: outer ring
230: inner ring
240: rolling element
250: first heat-treated hardened portion
260: spacer
270: second heat-treated hardened portion
300: constant velocity joint
310: rotating element
320: inner member
330: intermediate member

DETAILED DESCRIPTION

Hereinafter, preferred embodiments of the present disclosure will be described in detail with reference to the accompanying drawings at such an extent that they can be readily practiced by those ordinary skilled in the art.

In order to clearly describe the present disclosure, detailed descriptions of parts irrelevant to the present disclosure will be omitted, and the same reference numerals will be given to the same components throughout the specification. Further, a shape and size of each component shown in the drawings are arbitrarily shown for the sake of convenience in description, and hence the present disclosure is not necessarily limited to the shape and size shown. That is, it should be understood that specific shapes, structures and characteristics described herein may be modified from one embodiment to another embodiment without departing from the spirit and scope of the present disclosure. Further, positions or arrangements of individual components may also be modified without departing from the spirit and scope of the present disclosure. Therefore, the detailed descriptions described below are not to be taken in a limiting sense, and the scope of the present disclosure is to be taken as covering the scope claimed by the appended claims and their equivalents.

Figure 4:
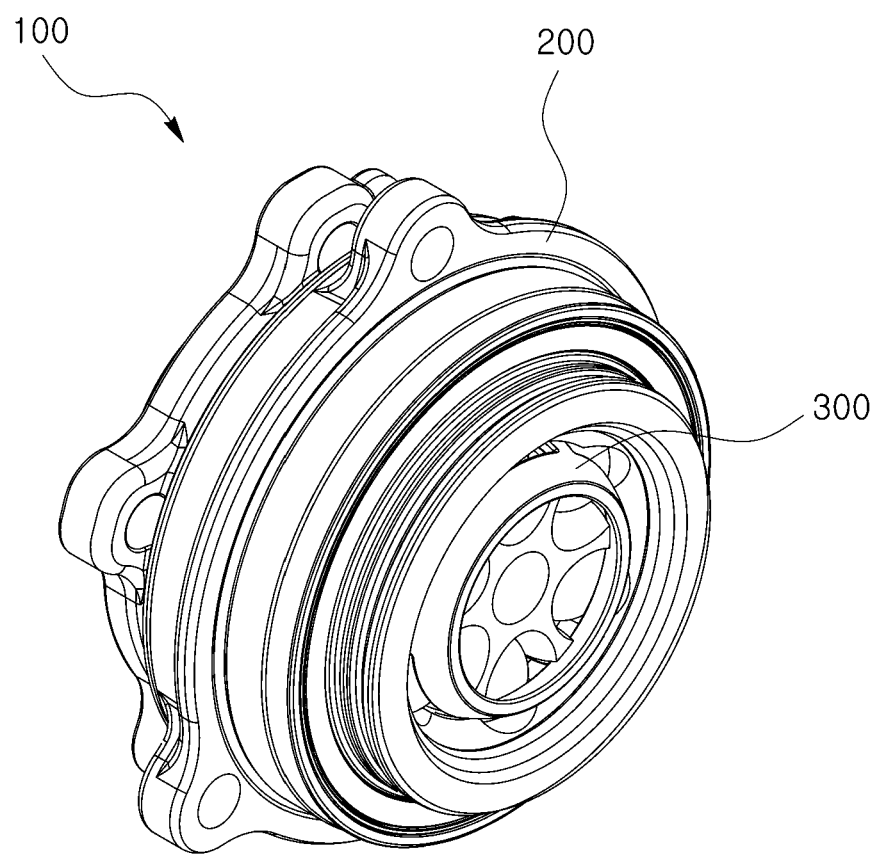
FIG. 4 exemplarily illustrates a perspective view of a wheel bearing assembly according to one embodiment of the present disclosure.
Figure 5:
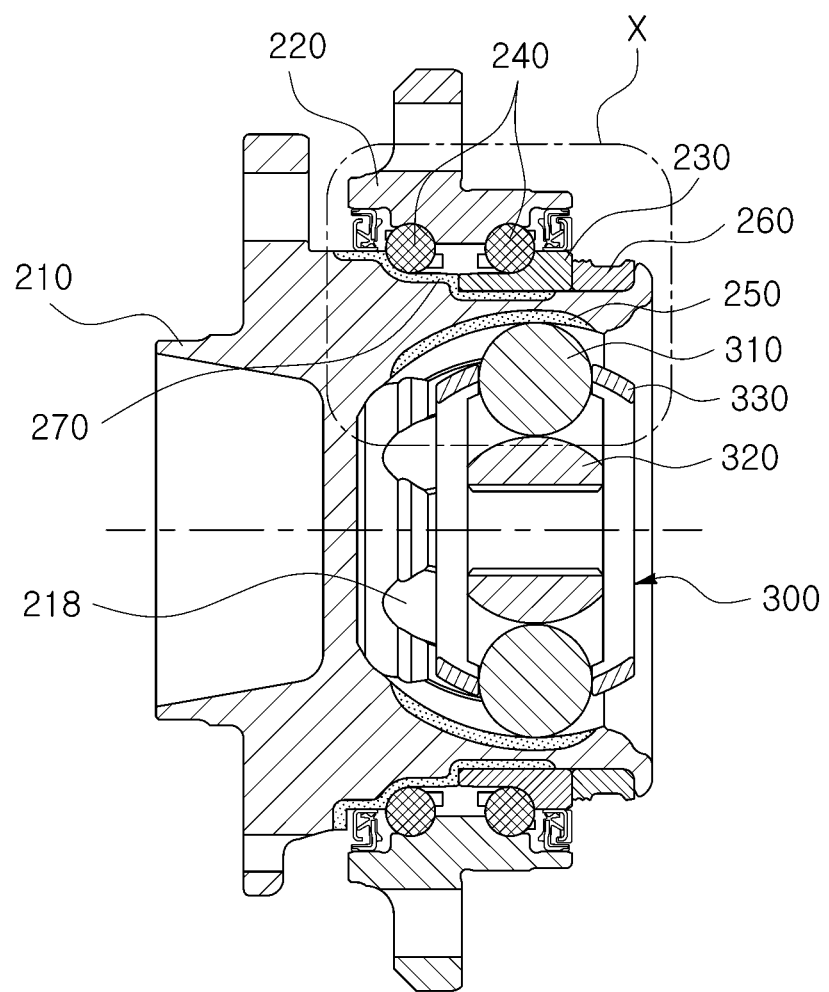
FIG. 5 exemplarily illustrates a cross-sectional structure of the wheel bearing assembly according to one embodiment of the present disclosure.

Referring to FIGS. 4 to 12, a wheel bearing assembly 100 according to one embodiment of the present disclosure is exemplarily shown. As shown in FIGS. 4 and 5, the wheel bearing assembly 100 according to one embodiment of the present disclosure may be configured such that a constant velocity joint 300 is coupled to a wheel bearing 200 for rotatably mounting and supporting a wheel to a vehicle body.

According to one embodiment of the present disclosure, the wheel bearing 200 may be configured such that a rotating member (for example, a wheel hub 210 and an inner ring 230) is mounted on a non-rotating element (for example, an outer ring 220) through rolling elements 240 and the wheel mounted on the rotating element is relatively rotatably supported by the vehicle body to which the non-rotating element is coupled, similar with typical vehicular wheel bearings.

According to one embodiment of the present disclosure, the wheel hub 210 may be formed in a generally cylindrical shape extending along an axial direction. A hub flange 212 may be provided on one side of an outer peripheral surface of the wheel hub 210. The hub flange 212 is formed in a shape extending radially outward of the wheel hub 210, and may be used to mount the wheel to the wheel hub 210 via hub bolts or the like. On the other hand, the inner ring 230 may be press-fitted and mounted to a vehicle-body-side end portion of the wheel hub 210. A raceway (inner raceway) of the rolling elements 240 may be formed on a portion of the outer peripheral surface of the wheel hub 210 such that the rolling elements 240 are supported by the wheel hub 210.

According to one embodiment of the present disclosure, the outer ring 220 may be configured to have a mounting flange 222, which is provided on one side of an outer peripheral surface of the outer ring 220 and is used to mount the wheel bearing 200 to the vehicle body, and raceways, which is provided on one side of an inner peripheral surface of the outer ring 220 and with which the rolling elements 240 are brought into contact. The raceway (outer raceway) formed on the inner peripheral surface of the outer ring 220 may be configured to cooperate with a raceway (inner raceway) formed on the inner ring 230 to accommodate and support the rolling elements 240 between the raceways.

According to one embodiment of the present disclosure, the inner ring 230 may be configured to be press-fitted and mounted to the outer peripheral surface of the wheel hub 210. The raceway (the inner raceway) for the rolling elements 240 may be formed on one side of the outer peripheral surface of the inner ring 230 to support the rolling elements 240 from the radially inside. As shown in FIG. 5, the inner ring 230 mounted on the wheel hub 210 may be configured to be fixed to the wheel hub 210 by plastically deforming the end portion of the wheel hub 210 or by coupling a fastening member such as a nut to the vehicle-body-side end portion of the wheel hub 210.

According to one embodiment of the present disclosure, the rolling elements 240 may be disposed between the raceway (the inner raceway) formed on the rotating member (for example, the wheel hub 210 and/or the inner ring 230) and the raceway (the outer raceway) formed on the non-rotating member (for example, the outer ring 220), which makes it possible to rotatably support the wheel hub 210 to which the wheel is mounted with respect to the outer ring 220 fixed to the vehicle body.

Figure 10:
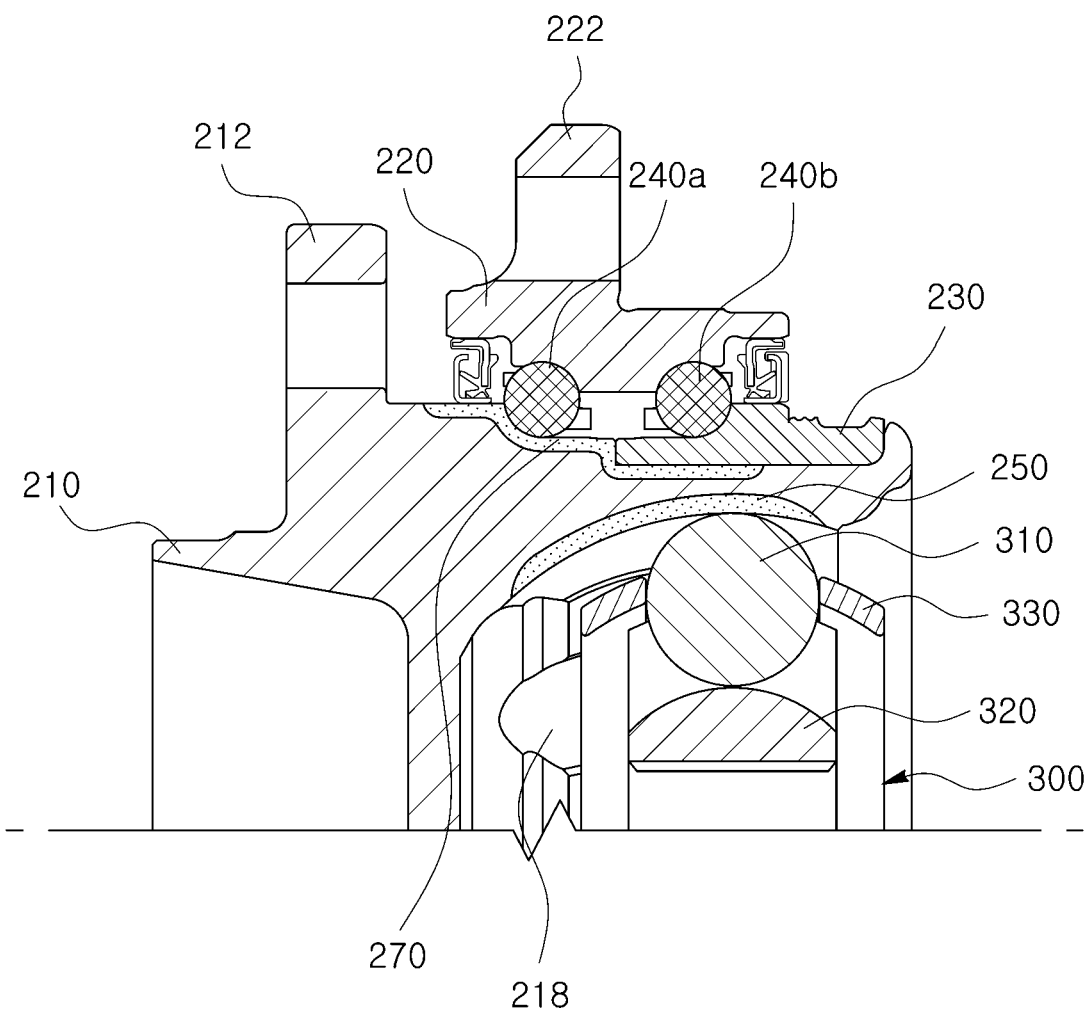
FIG. 10 exemplarily illustrates a modification of the wheel bearing assembly according to one embodiment of the present disclosure.
Figure 11:
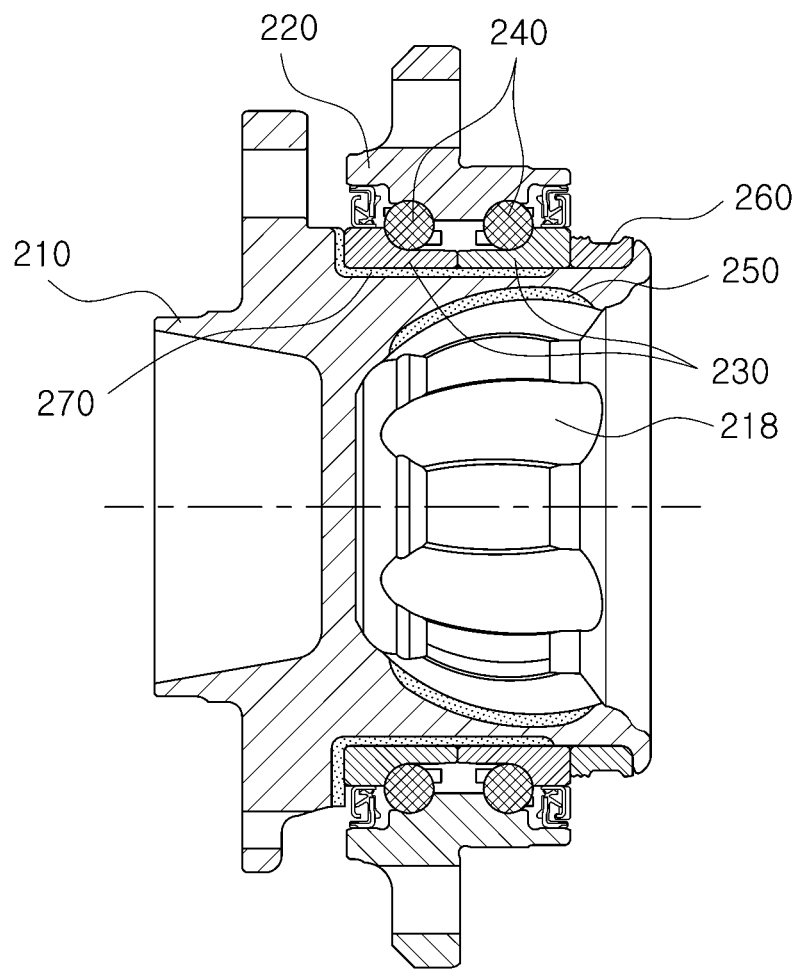
FIG. 11 exemplarily illustrates a modification of the wheel bearing assembly according to one embodiment of the present disclosure.
Figure 12:
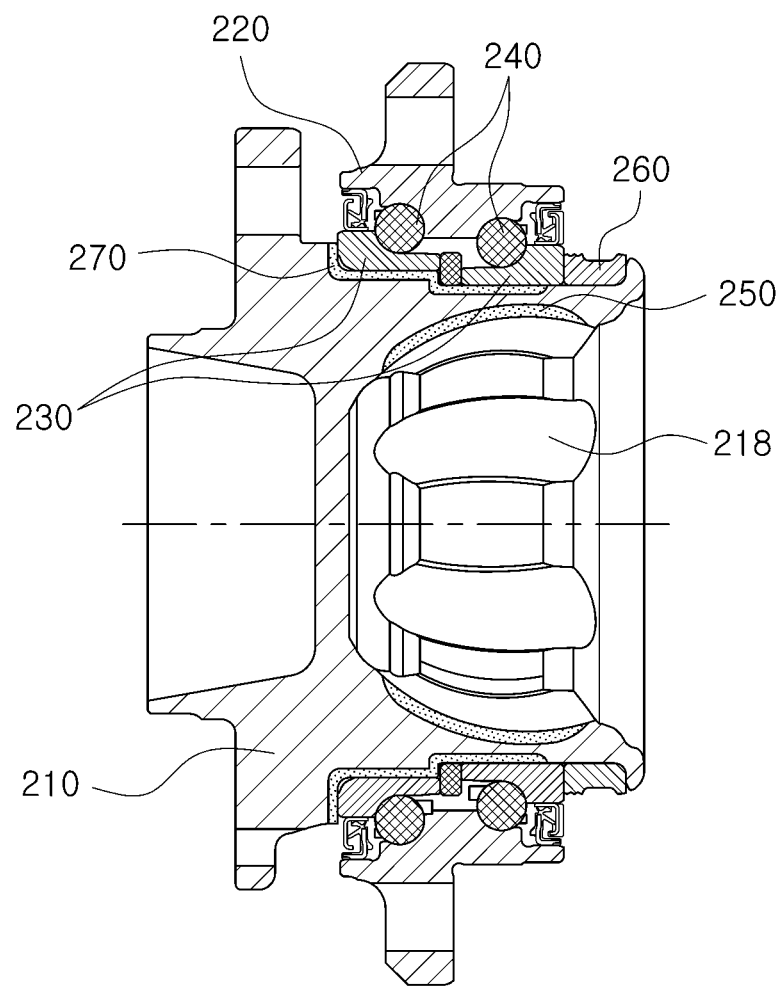
FIG. 12 exemplarily illustrates a modification of the wheel bearing assembly according to one embodiment of the present disclosure.

In the embodiments described with reference to FIGS. 4 to 10, the wheel bearing is configured such that one raceway for supporting the rolling elements is directly formed on a portion of the outer peripheral surface of the wheel hub. However, the wheel bearing according to one embodiment of the present disclosure is not necessarily limited to such a configuration. The wheel bearing according to one embodiment of the present disclosure may be modified in various forms. For example, the wheel bearing according to one embodiment of the present disclosure may be configured such that two inner rings are mounted to the wheel hub and the rolling elements are supported by the two inner rings, as shown in FIG. 11. Alternatively, the wheel bearing according to one embodiment of the present disclosure may be configured such that double-row rolling elements may be provided at different pitch circle diameters, as shown in FIG. 12.

Figure 8:
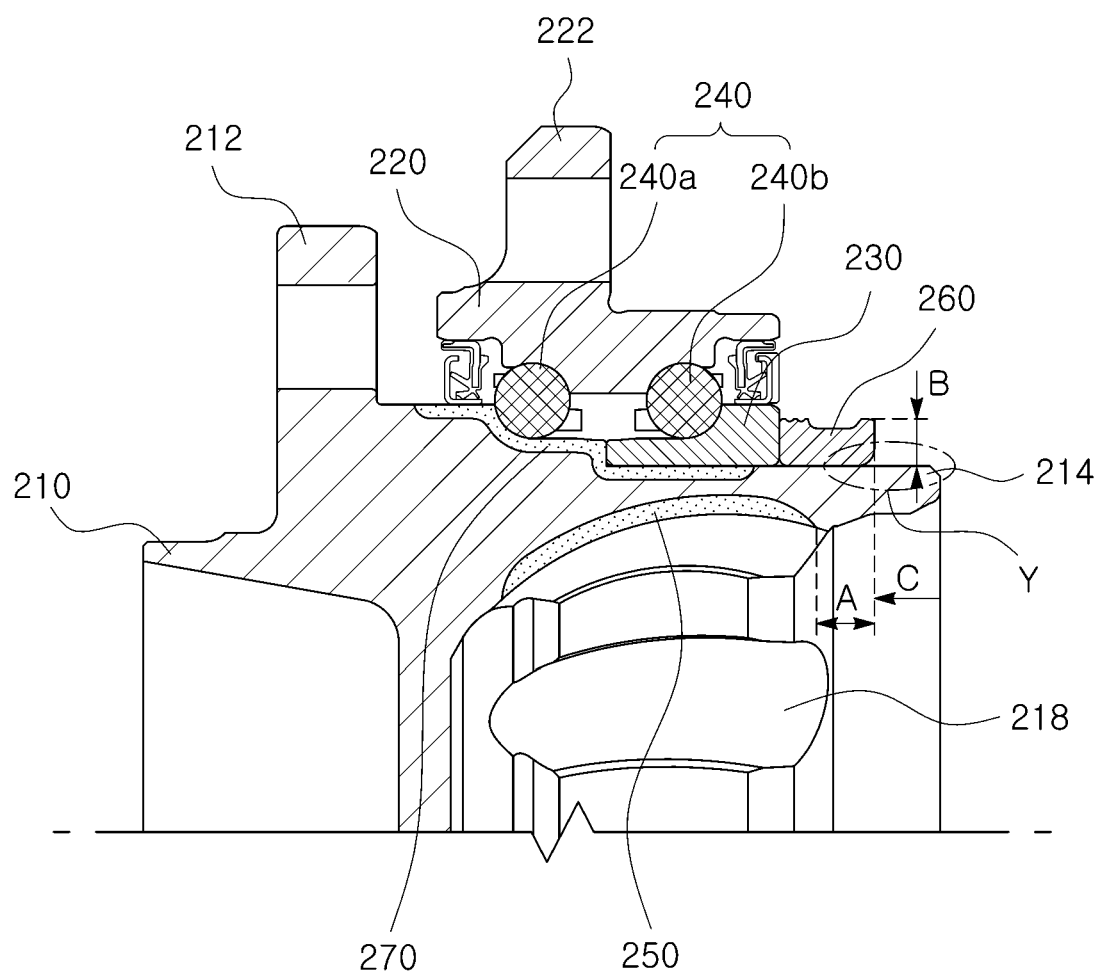
FIG. 8 exemplarily illustrates a cross-sectional structure of the wheel bearing assembly before a wheel hub of the wheel bearing assembly shown in FIG. 5 undergoes a plastic deformation.
Figure 9:
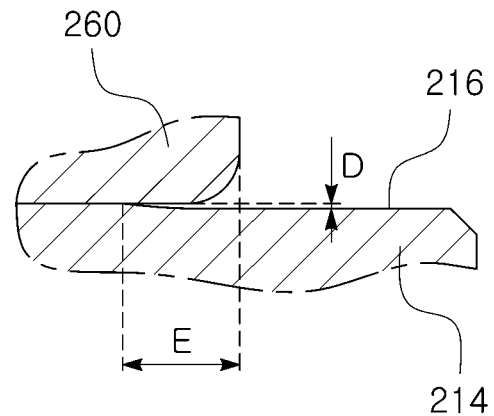
FIG. 9 exemplarily illustrates a partially enlarged view of a portion Y in FIG. 8.

According to one embodiment of the present disclosure, the wheel bearing 200 may be configured such that the inner ring 230 is fixed to the wheel hub 210 in a state in which an appropriate pre-load is applied by plastically deforming a vehicle-body-side end portion of the wheel hub 210 in a radially-outward direction, as shown in FIG. 5. To this end, the wheel bearing 200 according to one embodiment of the present disclosure may be configured such that the wheel hub 210 has an extension portion 214 formed to extend toward the vehicle body along the axial direction on the vehicle-body-side end portion thereof before the vehicle-body-side end portion of the wheel hub 210 are plastically deformed, as shown in FIG. 8.

Figure 2:
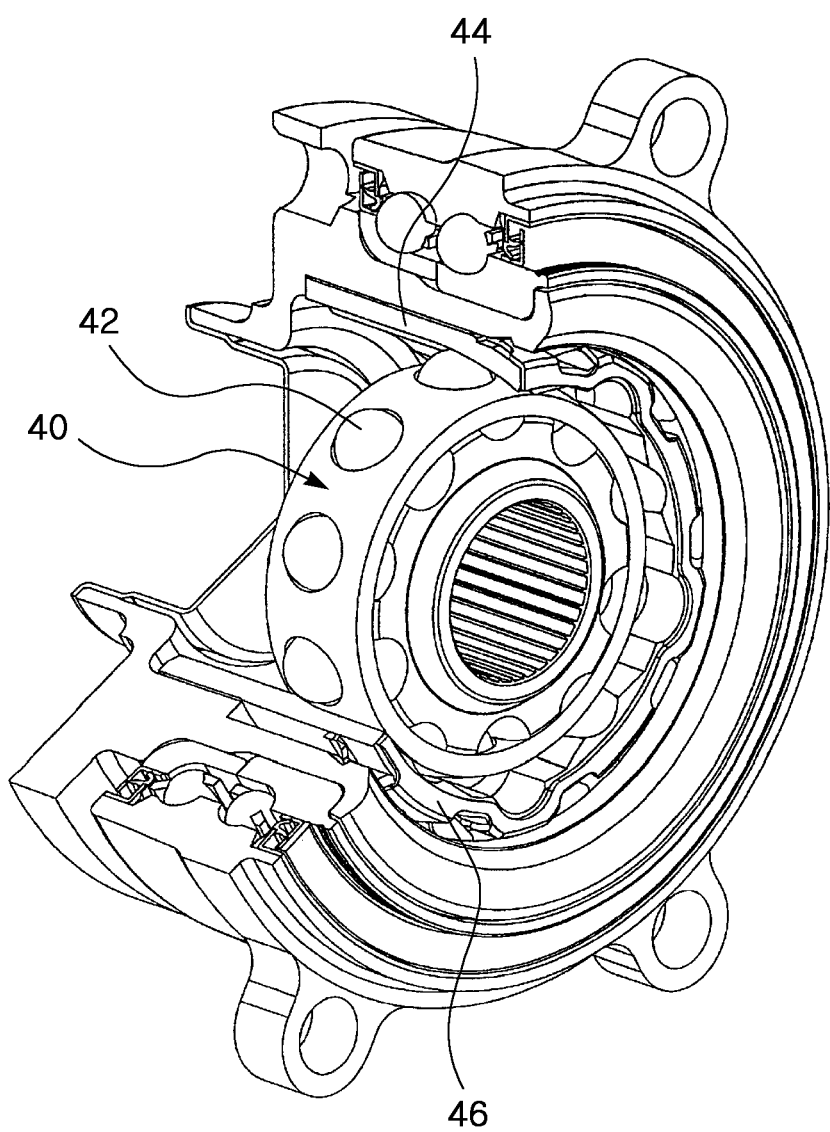
FIG. 2 exemplarily illustrates a conventional fourth-generation wheel bearing assembly.
Figure 3A:
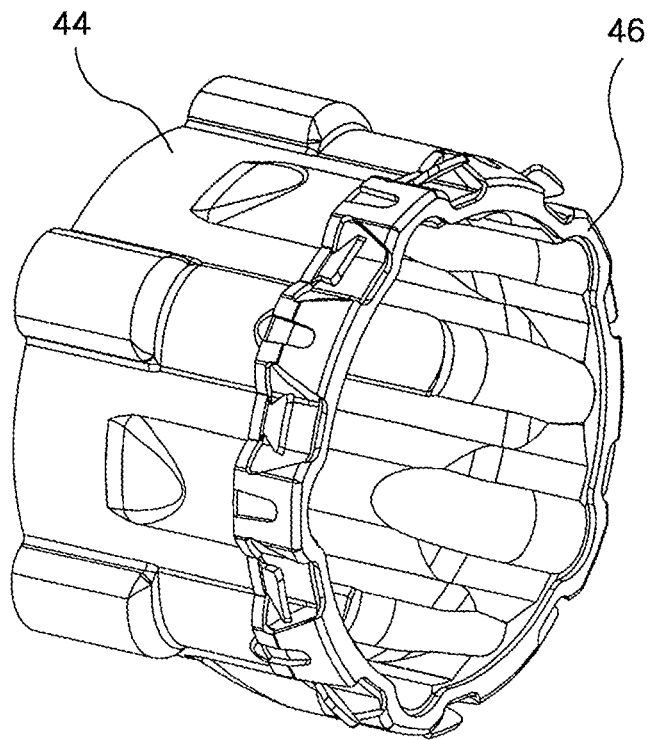
FIG. 3 exemplarily illustrates a conventional fourth-generation wheel bearing assembly.
Figure 3B:
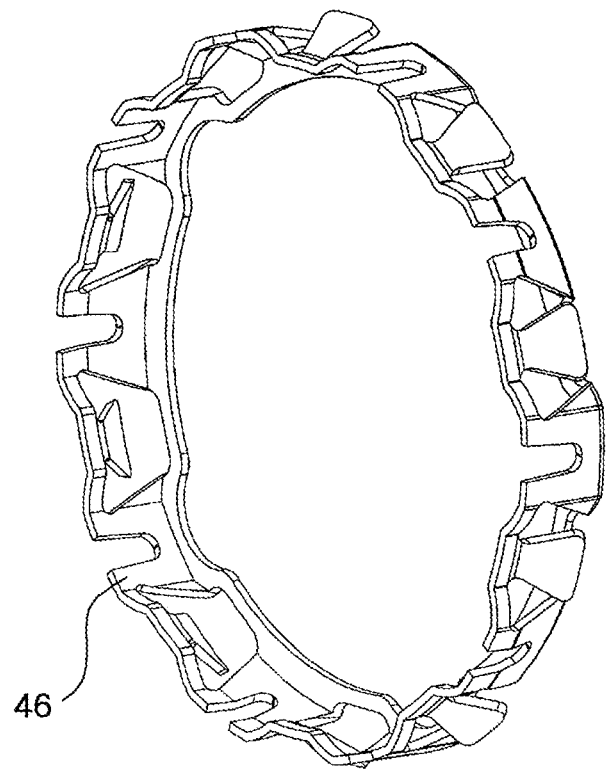

According to one embodiment of the present disclosure, an inner peripheral surface of the vehicle-body-side end portion of the wheel hub 210 may be configured to perform a function of supporting a rotating elements 310 of the constant velocity joint 300 from the outside (the function performed by the outer member provided between the wheel hub and the constant velocity joint shown in FIGS. 2 and 3). To this end, the wheel bearing 200 according to one embodiment of the present disclosure may be configured such that an accommodation space is formed inward of the vehicle-body-side end portion of the wheel hub 210 to accommodate the constant velocity joint 300 and recesses 218 are provided in an inner peripheral surface of the accommodation space to accommodate the rotating elements 310 of the constant velocity joint. Thus, the rotating elements 310 of the constant velocity joint 300 may be accommodated in and coupled to the recesses 218. A plurality of recesses 218 may be formed on the inner peripheral surface of the vehicle-body-side end portion of the wheel hub 210 (the inner peripheral surface of the accommodation space) in a spaced-apart relationship with each other along a circumferential direction so as to correspond to the number of rotating elements 310 provided in the constant velocity joint 300.

As described above, the wheel bearing 200 according to one embodiment of the present disclosure is configured such that the rotating elements of the constant velocity joint are supported in direct contact with the inner peripheral surface of the vehicle-body-side end portion of the wheel hub 210. Thus, raceways having a high strength are required on the inner peripheral surface of the vehicle-body-side end portion of the wheel hub 210 in contact with the rotating elements 310 of the constant velocity joint 300. Therefore, the wheel bearing 200 according to one embodiment of the present disclosure is configured to have a heat-treated hardened portion (first heat-treated hardened portion 250) formed on the inner peripheral surface of the vehicle-body-side end portion of the wheel hub 210 (the inner peripheral surface of the accommodation space). As a result, the rotating elements 310 of the constant velocity joint 300 can be stably held within the wheel hub 210 without damaging the wheel hub 210.

According to one embodiment of the present disclosure, the first heat-treated hardened portion 250 formed on the inner peripheral surface of the vehicle-body-side end portion of the wheel hub 210 may be configured to have a hardened layer which is formed on the area at least including all portions in contact with the rotating elements 310 of the constant velocity joint 300, so as to ensure the stable rotation and support of the rotating elements 310 of the constant velocity joint 300.

According to one embodiment of the present disclosure, a heat-treated hardened portion having a high hardness may be further formed on a portion of the outer peripheral surface of the wheel hub 210 that constitutes the wheel bearing assembly (a portion in which the raceway of the rolling elements is formed or to which the inner ring is press-fitted, or the like). According to one embodiment of the present disclosure, for example, as shown in FIG. 5, the heat-treated hardened portion (a second heat-treated hardened portion 270) formed on the outer peripheral surface of the wheel hub 210 may be preferably formed to extend from a portion near the wheel rather than the inner raceway of the rolling elements, which is formed on the outer peripheral surface of the wheel hub 210, to before the vehicle-body-side end portion of the inner ring 230 press-fitted to the wheel hub. If the heat-treated hardened portion (the second heat-treated hardened portion 270) formed on the outer peripheral surface of the wheel hub 210 begins to be formed at a position of the vehicle-body-side rather than the position where the inner raceway of the rolling elements is formed, there is a concern that a sufficient contact surface having a high strength may not be provided for the inner raceway of the rolling elements, thus shortening the lifespan of the wheel bearing. Conversely, if the heat-treated hardened portion (the second heat-treated hardened portion 270) formed on the outer peripheral surface of the wheel hub 210 is formed to reach a position beyond the vehicle-body-side end portion of the inner ring 230, the second heat-treated hardened portion 270 may undergo plastic deformation in a process of plastically deforming the vehicle-bodyside end portion of the wheel hub 210. This may cause damage such cracks or the like in the second heat-treated hardened portion 270. [Meanwhile, in the embodiment in which the two inner rings are mounted to the wheel hub as shown in FIGS. 11 and 12, the second heat-treated hardened portion 270 may be formed to extend from a portion near the wheel rather than the wheel-side inner ring before the vehicle-body-side end portion of vehicle-body-side inner ring.]

According to one embodiment of the present disclosure, the first heat-treated hardened portion 250 formed on the inner peripheral surface of the wheel hub 210 and the second heat-treated hardened portion 270 formed on the outer peripheral surface of the wheel hub 210 may be formed through various well-known heat treatment methods such as high-frequency quenching, full-hardening heat treatment, and the like. Preferably, the first heat-treated hardened portion 250 and the second heat-treated hardened portion 270 may be thermally treated to have a hardness ranging from Hv 500 to Hv 900 so as to provide a stable raceway or the like.

According to one embodiment of the present disclosure, the first heat-treated hardened portion 250 formed on the inner peripheral surface of the wheel hub 210 and the second heat-treated hardened portion 270 formed on the outer peripheral surface of the wheel hub 210 needs to be formed to have a hardened layer enough to form a stable raceway for the rotating elements of the constant velocity joint and the rolling elements of the wheel bearing. Further, the first heat-treated hardened portion 250 and the second heat-treated hardened portion 270 need to be formed so as not to overlap each other. If both the first and second heat-treated hardened portions 250 and 270 are formed to overlap each other, there is a high risk of causing damage such as cracks in a portion where the first and second heat-treated hardened portions 250 and 270 overlap. This may be a cause of remarkably degrading the function and shortening the lifespan of the wheel bearing.

For this reason, in the wheel bearing assembly according to one embodiment of the present disclosure, the first heat-treated hardened portion 250 formed on the inner peripheral surface of the wheel hub 210 and the second heat-treated hardened portion 270 formed on the outer peripheral surface of the wheel hub 210 may be preferably formed to have a hardened layer of a depth of 1 mm to 3 mm. When the depth of the hardened layer is less than 1 mm, the hardened layer may not be formed at a sufficient depth on for the raceway with which the rotating elements of the constant velocity joint or the rolling elements of the wheel bearing are in contact, thus shortening the lifespan of the wheel bearing. Meanwhile, when the depth of the hardened layer exceeds 3 mm, there is a high risk of overlapping the first heat-treated hardened portion 250 formed on the inner peripheral surface of the wheel hub 210 and the second heat-treated hardened portion 270 formed on the outer peripheral surface of the wheel hub 210.

Meanwhile, according to one embodiment of the present disclosure, the thickness of the wheel hub 210 on which both the first heat-treated hardened portion 250 and the second heat-treated hardened portion 270 are formed (in the case of the embodiment shown in the drawings, the minimum radial thickness H between the outer peripheral surface of the wheel hub 210 on which the inner ring 230 is mounted and the inner peripheral surface of the wheel hub 210 with which the rotating elements 310 of the constant velocity joint 300 are in contact) may be preferably greater than or equal to 5 mm and less than or equal to 10 mm. When the thickness H is less than 5 mm, the first heat-treated hardened portion 250 formed on the inner peripheral surface of the wheel hub 210 and the second heat-treated hardened portion 270 formed on the outer peripheral surface of the wheel hub 210 may overlap each other, which may greatly cause damage such as cracks. Meanwhile, when the thickness H is greater than 10 mm, the diameter of the pitch circle of the rolling elements 240 mounted on the inner ring 230 may be increased, which may cause interference in assembling a knuckle mounting part and may increase the weight of the product to be more than necessary.

In the meantime, in the process of heat-treating the first heat-treated hardened portion 250 formed on the inner peripheral surface of the wheel hub 210 and the second heat-treated hardened portion 270 formed on the outer peripheral surface of the wheel hub 210 to have a high hardness, they may have an increased brittleness. As a result, when the first and second heat-treated hardened portions 250 and 270 undergoes the plastic deformation, cracks may be generated in the first and second heat-treated hardened portions 250 and 270. This may degrade the durability of the wheel bearing 200. To prevent such a problem, the wheel bearing 200 according to one embodiment of the present disclosure are configured such that the first and second heat-treated hardened portions 250 and 270 are positioned at a position spaced apart from a portion where the plastic deformation begins and thus the first and second heat-treated hardened portions 250 and 270 does not undergo the plastic deformation in the process of plastically deforming the vehicle-body-side end portion of the wheel hub 210 for fixing the inner ring 230 to the wheel hub 210.

For example, the wheel bearing 200 according to one embodiment of the present disclosure comprises a spacer 260 coupled to the vehicle-body-side end portion of the inner ring 230 such that the position where the plastic deformation begins is spaced at a predetermined distance A from the vehicle-body-side end portions of the first and second heat-treated hardened portions 250 and 270 in the axial direction to the vehicle-body-side along the axial direction. Specifically, the wheel bearing 200 according to one embodiment of the present disclosure is configured such that the end portion positioned close to the vehicle body among the vehicle-body-side end portion of the first heat-treated hardened portion 250 and the vehicle-body-side end portion of the second heat-treated hardened portion 270 is positioned to be spaced toward the wheel at a predetermined distance A from a position where the plastic deformation begins (from the vehicle-body-side end portion of the spacer 260 in the embodiment shown in FIGS. 5 and 6) so that the first and second heat-treated hardened portions 250 and 270 are not affected during the plastic deformation of the vehicle-body-side end portion of the wheel hub 210.

According to one embodiment of the present disclosure, it may be desirable that an axial distance A between the position where the plastic deformation begins and the end portion located more adjacent to the vehicle body among the vehicle-body-side axial end portion of the first heat-treated hardened portion 250 and the vehicle-body-side axial end portion of the second heat-treated hardened portion 270 may be preferably greater than or equal to 2 mm. When the distance A is smaller than 2 mm, the first and second heat-treated hardened portions 250 and 270 may undergo the plastic deformation in the process of fixing the inner ring 230 to the wheel hub 210 by plastically deforming the vehicle-body-side end portion of the wheel hub 210, thus causing damage such as cracks in the first and second heat-treated hardened portions 250 and 270.

Figure 6:
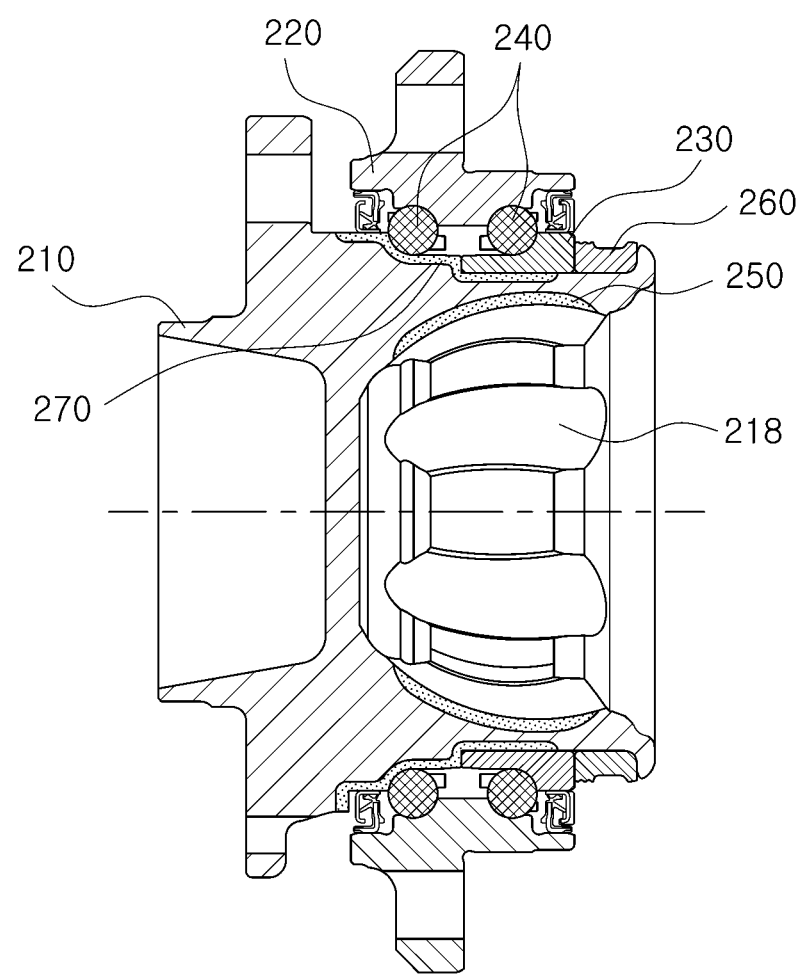
FIG. 6 exemplarily illustrates a cross-sectional structure in which a constant velocity joint is omitted in the wheel bearing assembly shown in FIG. 5.
Figure 7:
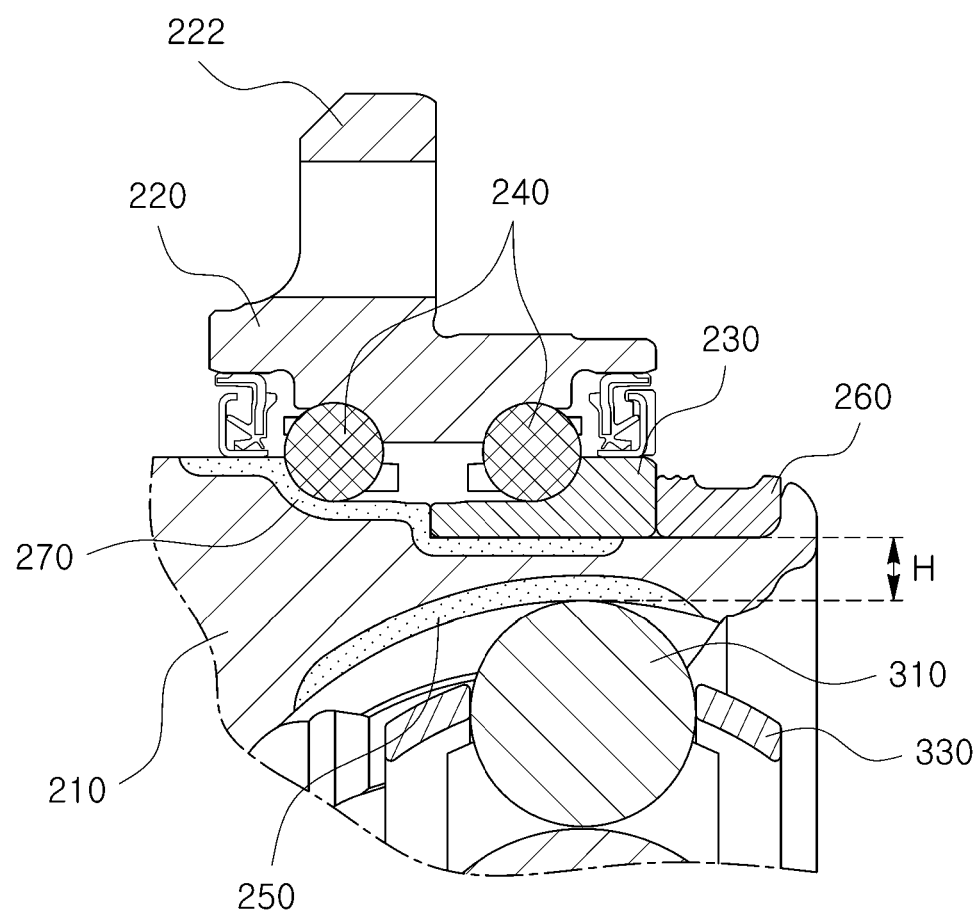
FIG. 7 exemplarily illustrates a partially enlarged view of a portion X in FIG. 5.

According to one embodiment of the present disclosure, the spacer 260 may be configured to be formed as a separate member from the inner ring 230 and then coupled to the vehicle-body-side end portion of the inner ring 230, as shown in FIGS. 5 and 6. Alternatively, the spacer 260 may be formed integrally with the inner ring 230, as shown in FIG. 10. Further, although not shown in the figure, a boot fastening portion (for example, the recess formed in the outer peripheral surface of the spacer 260 as shown in FIG. 8) to which a rubber boot is fastened may be additionally provided radially outward of the spacer 260 (radially outward of the corresponding inner ring in the case in which the spacer is formed integrally with the inner ring as shown in FIG. 10) to prevent foreign substance from flowing into the inner space of the constant velocity joint. Such a boot fastening portion is preferably configured such that at least a portion thereof is located radially outward of a region between the vehicle-body-side end portion of the first heat-treated hardened portion 250, which is formed on the inner peripheral surface of the vehicle-body-side end portion of the wheel hub 210, and the vehicle-body-side end portion of the spacer 260 (in the case in which the spacer is formed integrally with the inner ring as shown in FIG. 10, the vehicle-body-side end portion of the inner ring). By mounting the boot fastening portion radially outward of the spacer or the inner ring in this way, it becomes possible to prevent foreign substance from flowing into the wheel bearing.

According to one embodiment of the present disclosure, a ratio C/B of a height B of the portion where the plastic deformation begins in the wheel bearing [the height B means a height of the vehicle-body-side end portion of the spacer 260 in the case of the configuration in which the spacer 260 is coupled to the inner ring 230 as shown in FIG. 8; and the height B means a height of the vehicle-body-side end portion of the inner ring in the case in which only the inner ring is provided without a separate member such as the spacer as shown in FIG. 10 (when a plurality of inner rings are provided as shown in FIGS. 11 and 12, the height B means a height of the vehicle-body-side end portion of the inner ring which supports the rolling elements positioned on the side of the vehicle body)] to an axial distance C from the portion where the plastic deformation begins to the vehicle-body-side end portion of the wheel hub 210 may be greater than or equal to 0.5 and less than or equal to 2. When the ratio C/B is less than 0.5, a height at which a plastically deformed portion is sufficiently brought into contact with the end portion of the inner ring or the spacer where the plastic deformation begins may not be sufficiently ensured, and thus it is difficult to stably support the plastically-deformed portion. As a result, there is a concern that an appropriate pre-load is not applied to the wheel bearing. In contrast, when the ratio C/B exceeds 2, there is a concern that a higher-than-necessary material is accumulated in the portion where the plastic deformation occurs, which may hinder occurrence of an appropriate plastic deformation and may cause an unnecessary increase in weight of the wheel bearing.

According to one embodiment of the present disclosure, in order to prevent damage of the wheel hub 210 due to cracks or the like caused by interference with the inner ring 230 or the spacer 260 during the plastic deformation, a reduced-diameter portion 216 having a reduced diameter may be provided in the vehicle-body-side end portion of the wheel hub 210. The reduced-diameter portion 216 may be preferably formed so that a depth D from the portion where the inner ring 230 and/or the spacer 260 is mounted is greater than or equal to 0.1 mm and less than or equal to 0.5 mm. Further, an axial distance E from a starting position of the reduced-diameter portion 216 to the end portion where the plastic deformation begins (which means an axial distance from the starting position of the reduced-diameter portion 216 to the vehicle-body-side end portion of the spacer 260 in the configuration in which the spacer 260 is coupled to the inner ring 230 as shown in FIG. 8 and means an axial distance from the starting position of the reduced-diameter portion 216 to the vehicle-body-side end portion of the inner ring in the case in which only the inner ring is provided without a separate member such as the spacer as shown in FIG. 10) may preferably fall within a range of 0.5 mm to 5 mm. When the depth D is smaller than 0.1 mm or the distance E is smaller than 0.5 mm, there is a concern that stress may be concentrated between the edge of the inner ring 230 or the spacer 260 and the plastically-deformed portion in the process of plastically deforming the vehicle-body-side end portion of the wheel hub 210, thus causing cracks. Meanwhile, when the depth D exceeds 0.5 mm or the distance E exceeds 5 mm, there is a concern that floating may occur between the plastically-deformed portion and the spacer 260, which results in degradation of the durability of the wheel bearing.

As shown in FIG. 5, the constant velocity joint 300, which is connected to a driving shaft of a driving equipment, may be inserted into and coupled to the inner peripheral surface of the vehicle-body-side end portion of the wheel hub 210 that constitutes the wheel bearing 200 according to one embodiment of the present disclosure. As shown in the drawings, the constant velocity joint 300 according to one embodiment of the present disclosure may comprise the rotating elements 310, an inner member 320 configured to support the rotating elements 310 from the inside thereof, an intermediate member 330 (cage) having a pocket portion into which the rotating element 310 is inserted, and the like. A through-hole may be formed in the central portion of the inner member 320 of the constant velocity joint 300, and a central shaft connected to the driving shaft of the driving equipment may be inserted into the through-hole. On the other hand, the wheel bearing assembly 100 according to one embodiment of the present disclosure is configured such that the recesses 218 for accommodating the rotating elements 310 of the constant velocity joint 300 are formed on the inner peripheral surface of the vehicle-body-side end portion of the wheel hub 210 to directly support an outer surface of the rotating elements 310 of the constant velocity joint 300 through the wheel hub 210 of the wheel bearing 200. Thus, the constant velocity joint 300 can be stably inserted into and coupled to the wheel hub 210 of the wheel bearing 200, without providing any additional member between the wheel bearing 200 and the constant velocity joint 300. This makes it possible to reduce the wheel bearing assembly in size and weight.

However, the above-described configuration of the constant velocity joint 300 is just one example, and the constant velocity joint 300 used in the wheel bearing assembly 100 according to one embodiment of the present disclosure may be formed to have various well-known configurations in addition to the above-described configuration.

While the present disclosure has been described above by way of particular features such as specific components and the like, and exemplary embodiments, these embodiments are provided to further facilitate overall understanding of the present disclosure, and the present disclosure is not limited thereto. Various modifications and variations may be made from the above descriptions by those skilled in the art.

Therefore, the spirit of the present disclosure should not be limited to the above-described embodiments, and not only the append claims but also all those modified equally or equivalently to the claims are intended to fall within the scope of the spirit of the present disclosure.

What is claimed is:

1. A wheel bearing assembly comprising:
   a wheel hub having a hub flange on which a wheel is mounted;
   at least one inner ring configured to be press-fitted and mounted to one side of the wheel hub;
   an outer ring provided radially outward of the inner ring and having a mounting flange, which is formed on an outer peripheral surface of the outer ring and on which a vehicle body is coupled; and
   one or more rolling elements configured to rotatably support the wheel hub and the inner ring with respect to the outer ring,
   wherein an accommodation space is formed inward of a vehicle-body-side end portion of the wheel hub to accommodate a constant velocity joint,
   wherein a plurality of recesses for accommodating rotating elements of the constant velocity joint are formed on an inner peripheral surface of the accommodation space to be spaced apart from each other along a circumferential direction,
   wherein a first heat-treated hardened portion is formed on the inner peripheral surface of the accommodation space,
   wherein the first heat-treated hardened portion is formed to include portions with which the rotating elements of the constant velocity joint are brought into contact, and
   wherein a second heat-treated hardened portion is formed on an outer peripheral surface of the wheel hub, and the first heat-treated hardened portion and the second heat-treated hardened portion are formed so as not to overlap each other,
   wherein a spacer is provided at the vehicle-body-side end portion of the inner ring, and
   wherein a boot fastening portion to which a rubber boot is fastened is provided radially outward of the spacer.

2. The wheel bearing assembly of claim 1, wherein a depth of a hardened layer of the first heat-treated hardened portion and the second heat-treated hardened portion is greater than or equal to 1 mm and less than or equal to 3 mm.

3. The wheel bearing assembly of claim 2, wherein a minimum radial thickness H between the outer peripheral surface of the wheel hub on which the inner ring is mounted and an inner peripheral surface of the wheel hub with which the rotating elements of the constant velocity joint are brought into contact is greater than or equal to 5 mm and less than or equal to 10 mm.

4. The wheel bearing assembly of claim 3, wherein the inner ring mounted on the wheel hub is configured to be fixed on the wheel hub by plastically deforming the vehicle-body-side end portion of the wheel hub.

5. The wheel bearing assembly of claim 4, wherein an axial distance A between a vehicle-body-side axial end portion of the spacer and the vehicle-body-side end portion located more adjacent to the vehicle body among a vehicle-body-side axial end portion of the first heat-treated hardened portion and a vehicle-body-side axial end portion of the second heat-treated hardened portion is greater than or equal to 2 mm.

6. The wheel bearing assembly of claim 5, wherein, before plastically deforming the vehicle-body-side end portion of the wheel hub, a ratio CB between a height B of the vehicle-body-side end portion of the spacer and an axial distance C from the vehicle-body-side end portion of the spacer to the vehicle-body side end portion of the wheel hub is greater than or equal to 0.5 and less than or equal to 2.

7. The wheel bearing assembly of claim 5, wherein before plastically deforming the vehicle-body-side end portion of the wheel hub, a reduced-diameter portion having a reduced diameter is provided on an outer peripheral surface of the vehicle-body-side end portion of the wheel hub,
   wherein a depth D of the reduced-diameter portion is greater than or equal to 0.1 mm and less than or equal to 0.5 mm, and
   wherein an axial distance E between a starting position of the reduced-diameter portion and the vehicle-body-side axial end portion of the spacer is greater than or equal to 0.5 mm and less than or equal to 5 mm.

8. The wheel bearing assembly of claim 1,
   wherein the spacer is integrally formed with the inner ring, which is configured to support rolling elements located at the vehicle-body-side.

9. The wheel bearing assembly of claim 1, wherein, the spacer is formed as a separate member from the inner ring, which is configured to support rolling elements located at the vehicle-body-side.

10. The wheel bearing assembly of claim 1, further comprising: the constant velocity joint inserted into and coupled to the inner peripheral surface of the vehicle-body-side end portion of the wheel hub,
    wherein the constant velocity joint is coupled to the wheel hub such that the rotating elements are accommodated in the plurality of recesses formed on the inner peripheral surface of the vehicle-body-side end portion of the wheel hub.

* * * * *